United States Patent [19]

Nilsson

[11] 4,232,913
[45] Nov. 11, 1980

[54] RESTRICTOR FOR A BEARING POCKET IN A HYDROSTATIC BEARING

[75] Inventor: Bengt Nilsson, Lidköping, Sweden

[73] Assignee: Lidkopings Mekaniska Verkstads AB, Lipkoping, Sweden

[21] Appl. No.: 962,225

[22] Filed: Nov. 20, 1978

Related U.S. Application Data

[63] Continuation of Ser. No. 721,876, Sep. 9, 1976, abandoned.

[30] Foreign Application Priority Data

Oct. 9, 1975 [SE] Sweden ................................ 7511301

[51] Int. Cl.³ ............................................. F16C 32/06
[52] U.S. Cl. ....................................... 308/9; 308/5 R
[58] Field of Search ..................... 308/5 R, 9, 35, 121, 308/160, 168, 170, 172, DIG. 21; 184/5, 12

[56] References Cited

U.S. PATENT DOCUMENTS

| | | | |
|---|---|---|---|
| 3,466,951 | 9/1969 | Greenberg | 308/5 R |
| 3,719,405 | 3/1973 | Izumi et al. | 309/9 |

Primary Examiner—Frederick R. Schmidt
Attorney, Agent, or Firm—Eugene E. Renz, Jr.

[57] ABSTRACT

A fluid restrictor for a bearing pocket in a hydrostatic bearing. The bearing comprises a first member having a bearing pocket and a second member confronting and facing the bearing pocket and a channel in the first member for supplying a pressure medium. The channel is preferably located centrally of the pocket in the first bearing member. The outlet of the channel in the bearing pocket is surrounded by a projection having a part which is parallel to the bearing surface of the other member. The projection and bearing surface define a slot-like restrictor wherein the position of the part may be adjusted depthwise in the bearing pocket whereby the pressure in the pocket may be selectively regulated.

5 Claims, 5 Drawing Figures

RESTRICTOR FOR A BEARING POCKET IN A HYDROSTATIC BEARING

This is a continuation of application Ser. No. 721,876 filed Sept. 9, 1976 now abandoned.

BACKGROUND OF THE INVENTION

The invention relates to a fluid restrictor for a bearing pocket in a hydrostatic bearing of the kind referred to in the introduction of the appended claim 1.

Such hydrostatic bearings are used primarily for taking up great thrust loads in bearings adapted for slow relative movements. An example of such a bearing is described in the U.S. Pat. No. 3,322,473. The most essential object of the invention described therein is to obtain highest possible stiffness in the bearing, i.e., when the load of the bearing is changed a given amount, the slot opening or gap between the bearing surfaces is changed as little as possible.

The actual slot opening obtained in a hydrostatic bearing at a given load and a given fluid pressure can be theoretically calculated with knowledge of the other parameters of the bearing. Therefore the bearing can, in principle, be designed so that a desired opening is obtained at given working conditions. In practice, however, it is difficult to get a sufficient accuracy. It is therefore desirable to make it possible to adjust the opening in order to be adaptable to different working conditions. For this purpose it is known to provide exchangeable or adjustable restrictors in the supply line for the pressure medium, so that the fluid pressure in the bearing pockets and therewith also the opening between the bearing surfaces can be adjusted.

SUMMARY OF THE INVENTION

The purpose of the present invention is to provide a restrictor device in a hydrostatic bearing of the kind referred to above, with which a desired fluid pressure in the bearing pocket can readily be obtained, and which device consists of simple elements which are easy to make and to assemble.

The invention can advantageously be used in hydrostatic guide bearing systems for machine tools, wherein one bearing surface can consist of a guide ruler and the other bearing surface can be a slide provided with a number of bearing pockets with a supply of a pressure medium.

The characterizing features of the invention are stated in the appended claims.

BRIEF DESCRIPTION OF THE DRAWINGS

The invention will now be described in detail with reference to the accompanying drawings, in which.

DESCRIPTION OF SPECIFIC EMBODIMENTS

Figure 1:
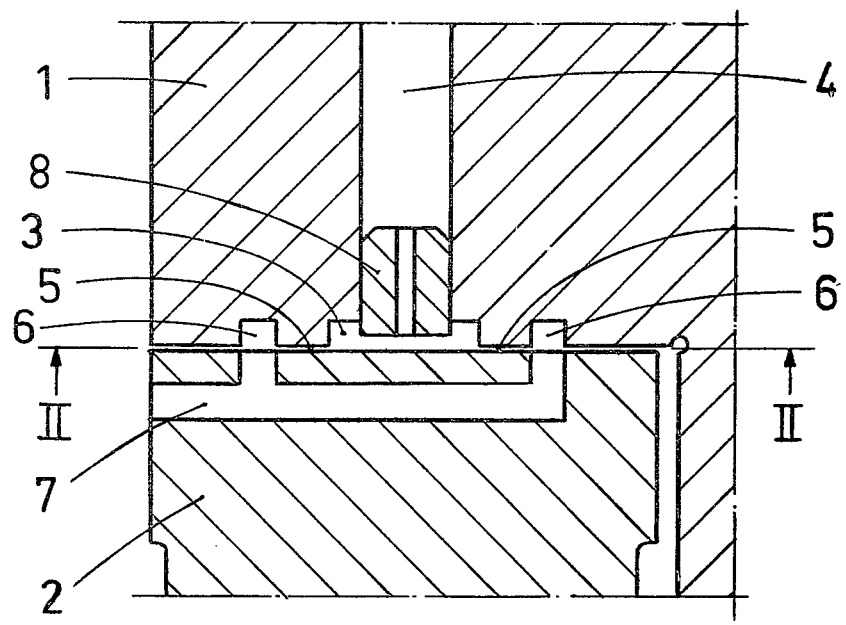
FIG. 1 shows a cross section through a bearing pocket and connecting parts of two machine elements which are relatively movable.

FIG. 1 shows a section through two relatively movable machine elements 1,2, e.g., a slide and a guide in a machine tool. The element 2 has a preferably plane upper surface, which co-operates with a facing surface on the element 1. The last mentioned surface is provided with at least one bearing pocket 3 to which a pressure medium can be supplied through a channel 4. After the passage through the bearing pocket and a surrounding slot opening 5, the pressure medium is drained via channels 6 through a draining passage 7 in a way which is normal for hydrostatic bearings.

In order to maintain an even flow of pressure medium to the bearing pocket 3 also when the load is varied, a restrictor device is provided in the channel 4. One detail in the restrictor device according to one embodiment of the invention has the reference number 8. The device is described in detail in connection to FIG. 3.

Figure 2:
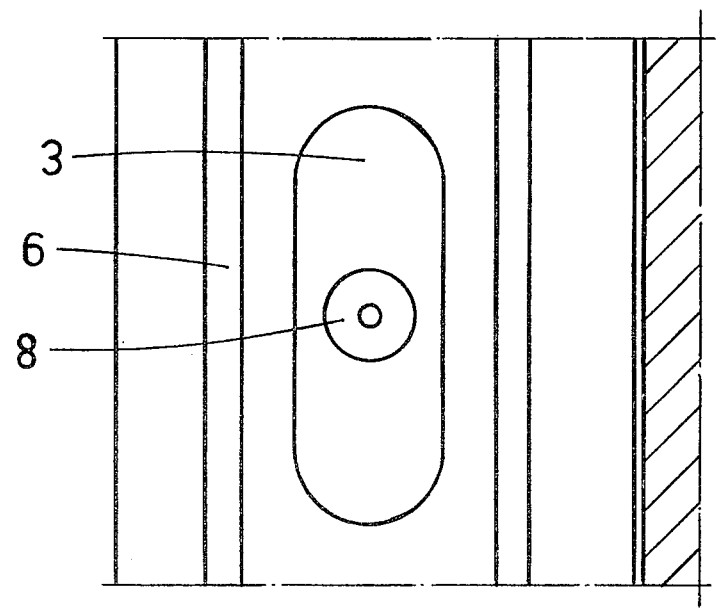
FIG. 2 shows a view according to II—II in FIG. 1 of a bearing pocket.

In case the machine elements 1,2 are a slide and a guide, i.e., when the relative motions in the bearing are linear, the bearing pocket 3 can be made oblong in the direction of motion, as can be seen in FIG. 2, whereby the mouth of the pressure medium channel and thereby also the restrictor device are situated in the middle of the bearing pocket.

Figure 3:
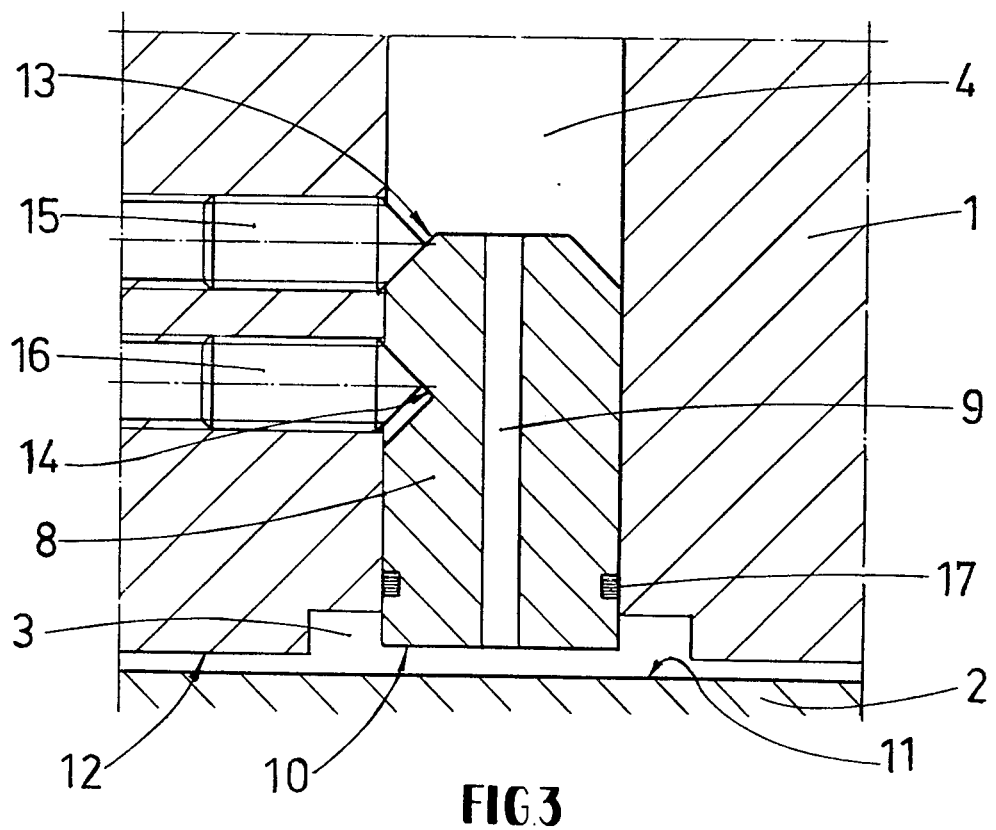
FIG. 3 shows a cross section through the restrictor according to one embodiment of the invention in a bearing pocket.

FIG. 3 shows an embodiment of the restrictor device according to the invention. In the channel 4, at its end in the bearing pocket 3, a piston 8 is provided, which piston is arranged to be movable perpendicularly to the bottom of the pocket 3. This piston has a central bore 9 for the pressure medium, and its end surface 10 situated in the bearing pocket 3, which surface is essentially parallel to the facing bearing surface 11, defines together with the surface 11 a slot restrictor around the mouth of the bore 9. The slot opening between the surfaces 10 and 11 is adjustable due to the movability of the piston 8 and is in practice always larger than the opening between the surface 11 and the bearing surface 12 of the element 1. By regulating the opening between the surfaces 10 and 11, the pressure in the pocket 3 and thereby also the opening between the bearing surfaces 11 and 12 can be adjusted.

The movability of the piston 8 can be achieved in different ways. It is, for example, possible to provide a threaded portion in the channel 4 and to provide a corresponding thread on the piston 8 on its envelope surface. Adjustment can thereby be carried out by turning of the piston in a desired manner. In FIG. 3, however, another embodiment of the adjustment means is shown. The piston 8 has a mainly cylindrical envelope surface and two axially spaced, obliquely in relation to the envelope surface arranged chamfers 13, 14, which cooperate with two adjustment screws 15, 16 provided with tapered ends, which screws are arranged in threaded bores in the element 1. By inwardly displacing one of the screws and outwardly displacing the other screw, the piston 8 can be accurately positioned as desired, and due to the existence of two screws, the poistion of the screw can be fixed securely.

In order to avoid leakage of pressure medium between the envelope surface of the piston and the wall of the channel 4, an O-ring 17 can be provided in a groove in the envelope surface of the piston.

Figure 4:
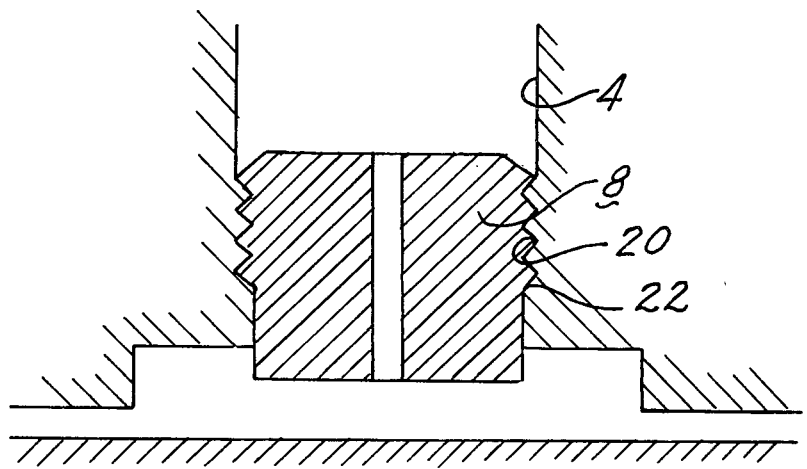
FIG. 4 is a sectional view through a restrictor in accordance with the present invention wherein the piston is threadedly mounted in the channel.
Figure 5:
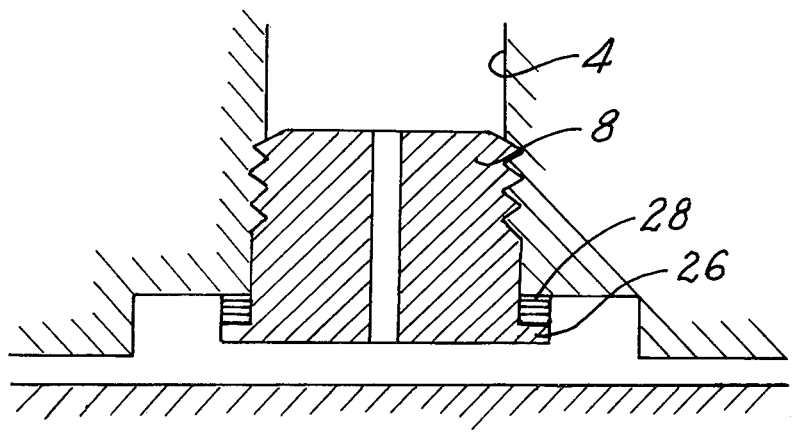
FIG. 5 is a further modification of a restrictor in accordance with the present invention showing washer adjusting means at the mouth of the channel.

There is shown in FIG. 4 a modification of the restrictor device in accordance with the present invention. In this instance the piston 8 is provided with screw threads 20 which mate with complementary screw threads 22 on the circumferential wall of the channel 4. This provides adjustability of the piston in the channel thereby to provide means for selectively regulating pressure in the pocket.

It is possible, within the scope of the invention, to achieve the adjustment possibility of the slot restrictor in other ways than described above. For example, it is possible to provide exchangeable washers 24 of different thickness around the mouth of the channel 4 instead of using a piston. In this instance the piston is provided with an enlarged head 26 defining a shoulder seating the washers 28. Note that in this embodiment the piston 8 is also threaded in the channel 4. By such a solution, the slot opening can not be adjusted continuously, however, but the device is simple and inexpensive.

I claim:

1. In an assembly comprising at least first and second movable machine elements having confronting first and second hydrostatic bearing surfaces, means defining a channel in said first machine element, at least one bearing pocket surrounding said channel at the end thereof adjacent said second bearing surface, a member mounted in said channel having an axial end face parallel to said second bearing surface defining therebetween a slot restrictor, said member having a through port to convey pressure medium from said channel directly to said slot restrictor inboard of said bearing pocket, means mounting said member for depthwise adjustment in said channel between an upper limit position and a lower limit position wherein the space between said axial end face and said second bearing surface is greater than the space between the said first and second bearing surfaces, actuation of said member in said channel between said limit positions selectively varying pressure in the bearing pocket from a constant pressure source and in turn varying the space between said first and second bearing surfaces.

2. In an assembly as claimed in claim 1, wherein the upper limit position is one wherein the axial end face of the piston is at least aligned with the base of the bearing pocket.

3. Fluid restrictor according to claim 1, characterized by that the element (8) has a threaded portion adapted to co-operate with a correspondingly threaded portion in the bore in the bottom of the bearing pocket (3).

4. Fluid restrictor according to claim 1, characterized by that exchangeable washers of different thickness can be provided around the mouth of the channel (4).

5. A fluid restrictor for a bearing pocket in a hydrostatic bearing of the type in which one bearing member comprises a bearing pocket, means defining a first channel in said one bearing member terminating preferably centrally of the pocket and a second bearing member comprising a bearing surface cooperating with and facing said bearing pocket, the mouth of the channel in the bearing pocket being surrounded by means projecting from the bottom of the bearing pocket, said means having a surface parallel to the bearing surface of said second bearing member and defining a slot restrictor, said surface being part of an element which is axially moveable in said first channel and including a second axial channel for a pressure medium, said element having a mainly cylindrical envelope surface and two axially spaced chamfers which are arranged obliquely to the envelope surface and cooperate with two adjustable screw members with tapered ends arranged in threaded bores in said first bearing member.

* * * * *